(12) United States Patent
Schwartz et al.

(10) Patent No.: US 8,181,934 B2
(45) Date of Patent: May 22, 2012

(54) SHUT-OFF DEVICE

(75) Inventors: Simon Schwartz, Dahn (DE);
Alexander Rothermel, Mannheim (DE);
Fabian Maier, Westheim (DE); Dirk Elsasser, Mannheim (DE); Heiko Gehr, Landau (DE); Wolfgang Sichler, Mannheim (DE); Harald Schmitt, Mannheim (DE); Michael Schneider, Mannheim (DE); Ralf Schmich, Heidelberg (DE)

(73) Assignee: Friatec Aktiengesellschaft, Mannheim (DE)

( * ) Notice: Subject to any disclaimer, the term of this patent is extended or adjusted under 35 U.S.C. 154(b) by 564 days.

(21) Appl. No.: 12/306,231

(22) PCT Filed: Jun. 25, 2007

(86) PCT No.: PCT/DE2007/001117
§ 371 (c)(1),
(2), (4) Date: Jul. 31, 2009

(87) PCT Pub. No.: WO2008/000233
PCT Pub. Date: Jan. 3, 2008

(65) Prior Publication Data
US 2009/0294718 A1 Dec. 3, 2009

(30) Foreign Application Priority Data
Jun. 29, 2006 (DE) .......................... 10 2006 030 027

(51) Int. Cl.
*F16K 1/16* (2006.01)
(52) U.S. Cl. .................... 251/301; 251/175; 137/614.11

(58) Field of Classification Search .................. 251/298, 251/301, 333, 175, 193; 137/613, 614.11
See application file for complete search history.

(56) References Cited

U.S. PATENT DOCUMENTS

| 1,949,011 A | * | 2/1934 | Fahey | 384/440 |
| 2,831,498 A | * | 4/1958 | Thomsen | 137/455 |

(Continued)

FOREIGN PATENT DOCUMENTS

DE 597 C 8/1877

(Continued)

OTHER PUBLICATIONS

International Search Report Dated Nov. 30, 2007.

*Primary Examiner* — John Fristoe, Jr.
(74) *Attorney, Agent, or Firm* — Marshall & Melhorn, LLC

(57) ABSTRACT

The invention relates to a shut-off device comprising a housing which is to be connected to an adjacent conduit in a pressure-tight manner. A tubular passage is defined in the housing for a medium flowing through the conduit. Said device also comprises at least one sealing body which can be displaced by an articulated mechanism, by means of an adjusting drive that can be moved vertically in relation to the direction of flow, from an open position into a closed position in which the sealing contour of the at least one sealing body comes into contact with the tubular passage in a radially sealing manner. The articulated mechanism is guided parallel to the direction of displacement of the adjusting drive and comprises a bearing body to which the at least one sealing body is pivotably applied. The inventive shut-off device is characterized in that the bearing body comprises two diametrically opposed ribs and two corresponding grooves are formed in the wall of the housing or in an insert at least partially lining the housing, the ribs forming a span extending transversally to the direction of flow of the medium.

13 Claims, 4 Drawing Sheets

U.S. PATENT DOCUMENTS

| | | | |
|---|---|---|---|
| 3,119,594 A | | 1/1964 | Heggem |
| 3,586,034 A | * | 6/1971 | Karzeniowski ............... 137/222 |
| 3,632,080 A | | 1/1972 | King |
| 3,876,179 A | | 4/1975 | Baumann |
| 3,913,603 A | * | 10/1975 | Torres ........................ 137/68.15 |
| 5,244,011 A | * | 9/1993 | Feldinger ................. 137/614.13 |
| 7,406,983 B2 | * | 8/2008 | Schwartz et al. ........ 137/614.11 |

FOREIGN PATENT DOCUMENTS

| | | |
|---|---|---|
| DE | 1 109 972 | 1/1962 |
| DE | 2 035 569 | 5/1972 |
| EP | 0 493 029 A1 | 1/1992 |
| FR | 1 141 242 | 8/1957 |
| WO | WO 03/100302 A1 | 12/2003 |

* cited by examiner

SHUT-OFF DEVICE

BACKGROUND

1. Field of the Invention

The invention relates to a shut-off device comprising a housing which is to be connected to an adjacent conduit in a pressure-tight manner. In such a shut-off device a tubular passage is defined in the housing for a medium flowing through the conduit. Said device also comprises at least one sealing body which can be displaced by an articulated mechanism, by means of an adjusting drive that can be moved vertically in relation to the direction of flow, from an open position into a closed position in which the sealing contour of the at least one sealing body comes into contact with the tubular passage in a radially sealing manner. The articulated mechanism comprises a bearing body on which the at least one sealing body is pivotably positioned whereby the bearing body is moved into the housing.

2. Background of the Invention

Shut-off devices are known from WO 2003/100302 A1 and are usually made from metal or plastics. Devices made from thermoplastic material have the advantage that the individual housing parts can be joined using relevant materials while employing commonly used welding methods. A joint can also easily be made to an existing PE conduit network. In WO 2003/100302 A1 it is preferable that a cleaning scraper can run through the shut-off device. For this purpose the at least one sealing body is in the open position while arranged outside the conduit.

While in the operating state, axial forces form in the direction of the flow of the medium which must be withstood by either the sealing body or the adjusting drive. There is, on the one hand, a static strain in the closed position of the device when one-sided pressure forces occur and, on the other hand, also a dynamic strain in the open position when the sealing body is in an intermediate position or when the sealing body is the position shortly prior to the closing of the device.

Therefore it is suggested in DE 11 09 972 to move the articulated mechanism parallel to the moving direction of the adjusting drive. U.S. Pat. No. 3,119,594 A describes the guiding of the sealing body.

BRIEF SUMMARY OF THE INVENTION

It is an object of the present invention to eliminate, or at least minimize, the above mentioned problem, which is achieved by a method according to claim 1 and a control station according to claim 8, respectively.

Thanks to the invention, a very reliable and cost efficient method is achieved in order to eliminate the risk that more than one workpiece at the time is fed into a production line, such as a pressing line in connection with the production of car body details.

It is thus the object of this invention to provide a shut-off device in which the above-described axial forces are easily and even better neutralized within the device.

This object is achieved in a shut-off device such as described above by fitting the bearing body with two diametrically opposed ribs and forming two corresponding grooves in the wall of the housing or in an insert at least partially lining the housing, the ribs forming a span extending transversally to the direction of flow of the medium. A consequence of this arrangement is that the transverse strain on the adjusting drive is intercepted during one-sided strain and the operational safety of the device is also ensured in the intermediate position. The bearing body forms a transverse span with which the axial forces uniformly can be lead into the housing.

Preferably, the housing comprises an insert in which the at least one groove is formed to allow for problem free prefabrication.

In a preferred embodiment, the bearing body comprises a carrier from which the at least one rib projects whereby the carrier surrounds the mounting for the at least one sealing body. That means that the bearing body can be in two parts whereby it is furthermore preferable that the mounting comprises an external thread for screwing it into the adjusting drive. The two-part design allows for the forces developing from the flowing medium to be optimally intercepted.

It is furthermore preferable that at least one sealing body is shaped as a flap that expands to the sealing contour when pressure from the flowing medium occurs in axial direction. The sealing body, for example, the flap, is deformed whereby this deformation additionally supports the sealing function of the sealing element preferably placed on the sealing contour as the pressure increases. Tolerances due to the stretching of the housing can also be accommodated in this manner. The inventive flap is self-sealing.

Below, examples of embodiments of the invention will be described in further detail by means of the drawings.

DETAILED DESCRIPTION OF THE INVENTION

Figure 1:
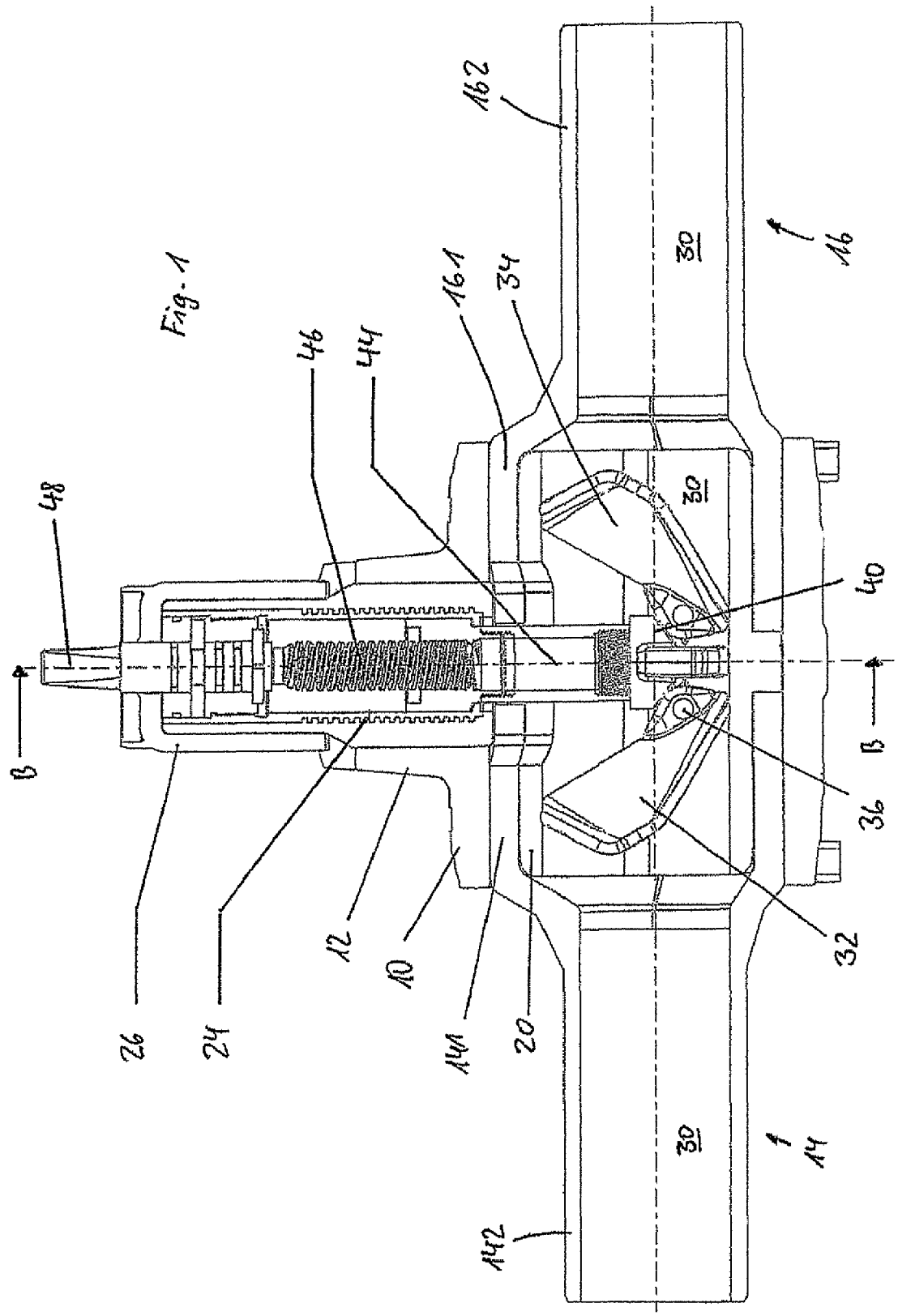
FIG. 1 is a longitudinal view through an embodiment of the invention of a shut-off device in accordance with the present invention.

The shut-off device in FIG. 1 is fitted with a housing 100 in which within an exterior housing 10 two opposite placed protruding ends 14, 16 are fitted. The plug-in ends 141 and 161 of each protruding end, are located completely in the exterior housing while the freestanding ends 142, 162 are meant for the connection of existing conduits. Within the housing 100 there is furthermore an insert 20, which lines the housing 100 in the area of the plug-in ends 141, 161. The conduit passage can be sealed with two flaps 32, 24 which can be moved by an adjusting drive, described as below in further detail, between an open position and a closed position. An articulated mechanism connects the flaps 32, 34 to a bearing body 40, which moves the drive 44 for the displacement of the flaps 32, 34 from the open position to the closed position and back. The axial movement of the drive 44 results from the pivoting movement of the spindle 46, which is displaced by the drive square 48. The necessary number of revolutions to open and close the device is determined by the pitch of the spindle 46 and the necessary travel to operate the device. The adjusting drive from the drive 44, spindle 46 and drive square 48 is lead out of the housing 100 in the normal way through an outlet 12.

Figure 2:
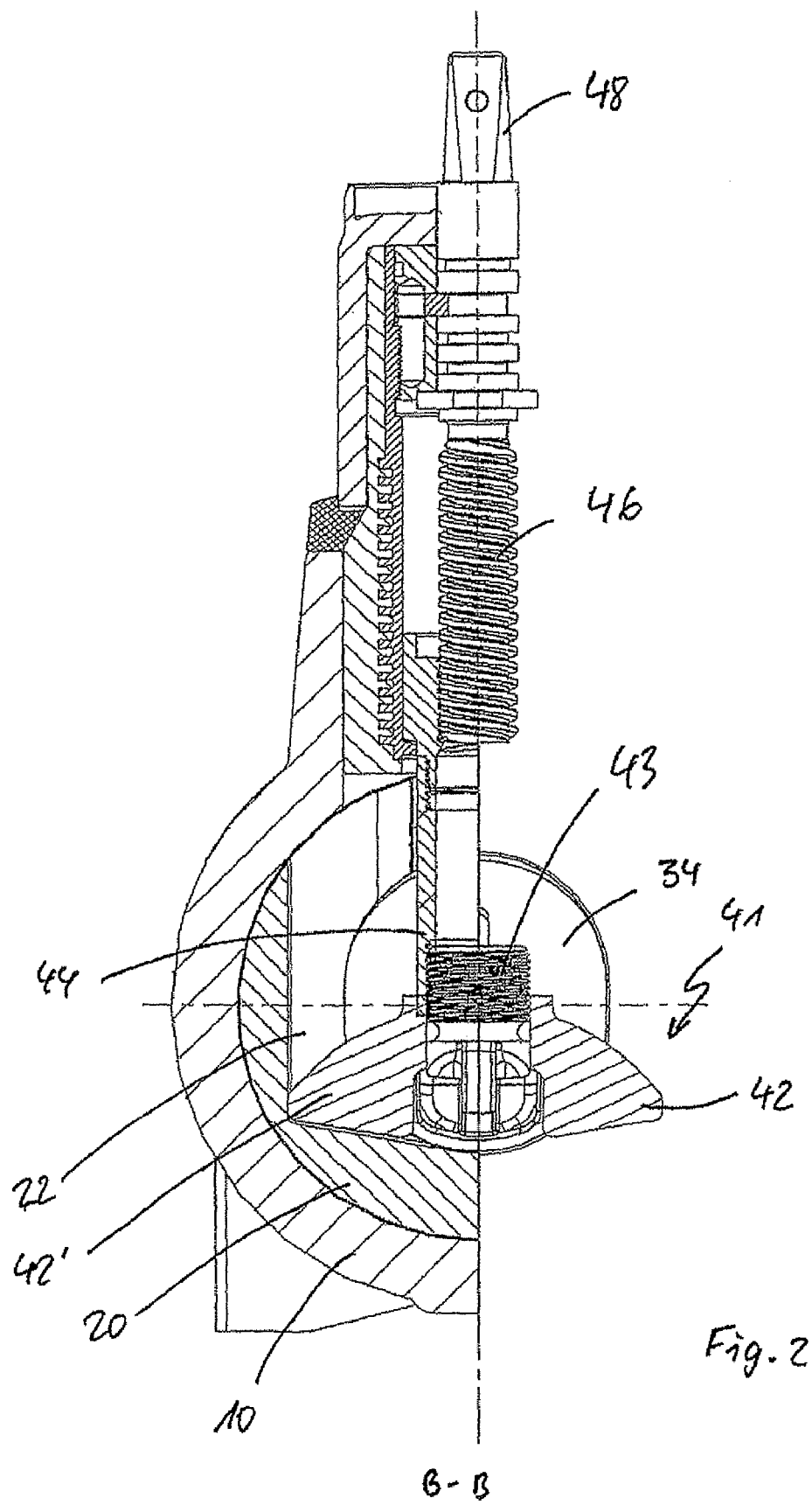
FIG. 2 is a sectional drawing along the B-B line from FIG. 1.

FIG. 2 is a partially fragmented sectional drawing along line B-B from FIG. 1. The bearing body 40 for the flaps, of which only one flap 34 can be seen here, is fitted with two ribs 42, 42; which are placed diametrically across from each other relative to the adjusting drive axis and thus form a transversal span. Each rib is guided in a groove 22 which in the embodiment shown is fitted in the insert 20 but also could be fitted directly into the wall of the housing. The grooves, of which only one groove 22 can be seen here, run in parallel direction to the adjusting drive axis so that forces that are released from the medium flowing through the device can be withstood.

The bearing body 40 is in two parts and is fitted with a carrier 41 on which the ribs 42, 42' preferably are individually placed. The carrier 41 surrounds the mounting 43 for the sealing bodies 32, 34 which mounting is shaped as an external thread that is screwed into the drive 44.

Figure 3:
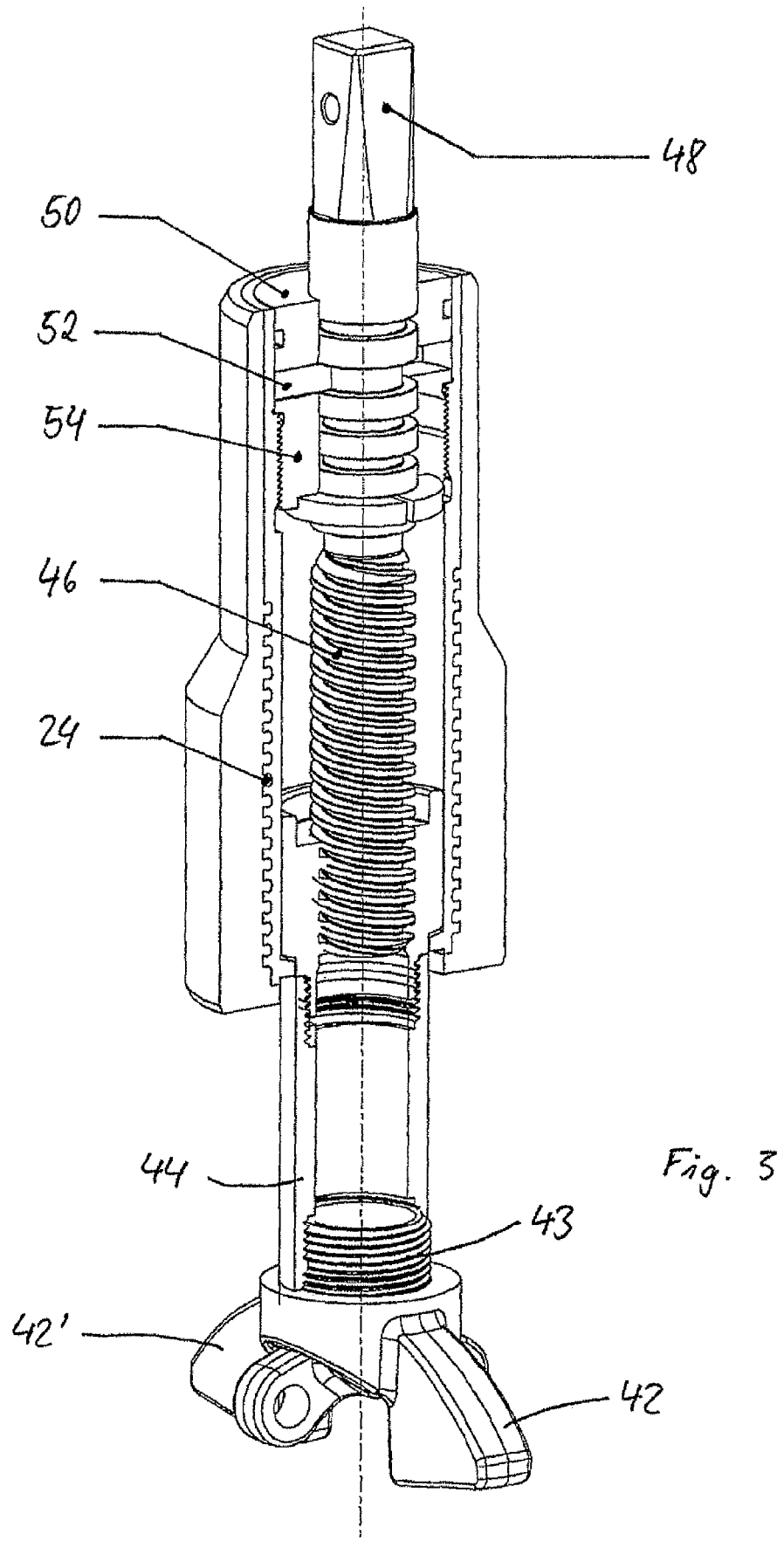
FIG. 3 is a perspective drawing of an adjusting drive fitted with a bearing body in accordance with the present invention.

FIG. 3 shows the situation in a perspective view. The flaps have been omitted in this drawing for reasons of clarity. The rib 42 fitted on the bearing body 40 is shown with a V-shaped exterior contour, but other shapes are possible. FIG. 3 also reveals other details about the adjusting drive. The spindle 46 is located within the dome 24, which is made from metal covered with a thermoplastic material such as polyethylene. The positioning of the spindle 46 occurs with a guiding disc 52, which is fitted in the upper part of the dome 24 near the drive square 48. The guiding 56 of the drive 44 occurs as the cladding 24 is adjusted, whereby the ribs 42, 42' prevent the shifting of the bearing body 40, which is guided in the grooves 22 (FIG. 2). The upper and the lower stops 60, 62 are metallic. The upper stop 60 is realized by a stopper ring 54, the lower stop 62 by the correspondingly shaped bottom area of the dome 24. The dome 24 is sealed with a metallic seal 50 to the drive square 48.

Figure 4:
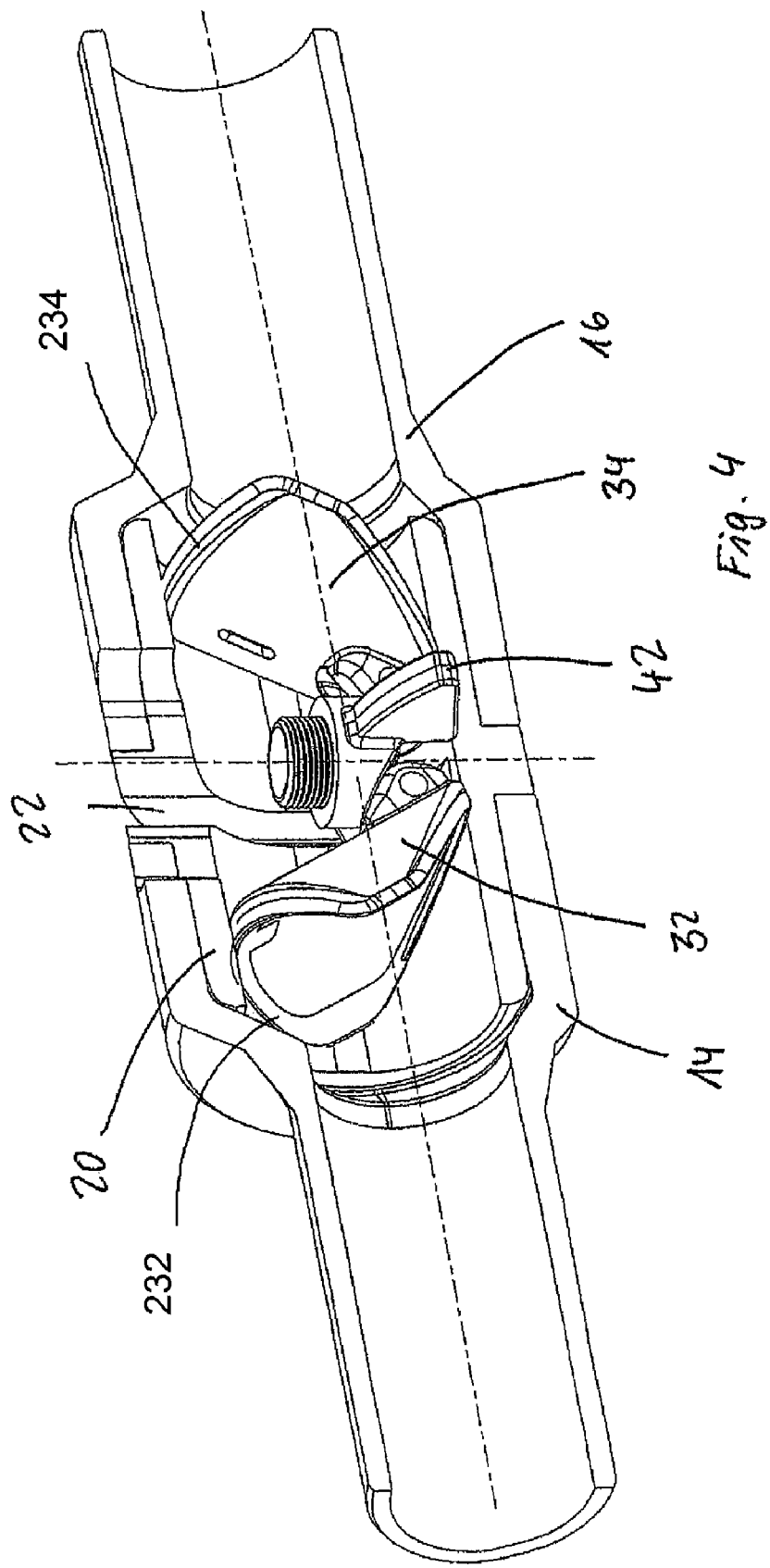
FIG. 4 is a view of the shut-off device in which the position of the groove is particularly clearly illustrated.

FIG. 4 shows a sectional view through the device in which the exterior housing and the adjusting drive are not shown: The flaps 32, 34 which are attached to the articulated mechanism 36 are in the closed position. Depending on the chosen thickness of the flaps 32, 34 they deform as the force is absorbed whereby the higher the pressure is, the more they deform. This deformation additionally supports the sealing function of the sealing element 232, 234 fitted on the circumference of the flaps 32, 34 as the pressure rises. Furthermore, due to the deformation of the housing 100, tolerances can be accommodated. Additional force absorption occurs, as has already been described, by way of the ribs 42 in the bearing body 40 which are displaced in the grooves 22 of the insert 20.

The characteristics of the invention revealed in the above specifications, in the drawings, as well as in the patent claims, could be significant for the realization of the invention individually as well as in any combination.

What is claimed is:

1. A shut-off device comprising:
   a housing which is to be connected to an adjacent conduit in a pressure-tight manner, wherein a tubular passage is defined in the housing, for a medium flowing through the conduit;
   at least one sealing body which can be displaced by an articulated mechanism by means of an adjusting drive that can be moved vertically in relation to the direction of flow, from an open position into a closed position in which the sealing contour of the at least one sealing body comes into contact with the tubular passage in a radially sealing manner; wherein
   the articulated mechanism is guided parallel to the direction of displacement of the adjusting drive and comprises a bearing body to which the at least one sealing body is pivotably applied;
   the bearing body comprises two diametrically opposed ribs and in the wall of the housing or in an insert at least partially lining the housing correspondingly two grooves are formed whereby the ribs form a span extending transversally to the direction of flow of the medium; and
   the sealing contour of the at least one sealing body expands during substantial axial pressure caused by the flowing medium.

2. The shut-off device according to claim 1, wherein the bearing body is fitted with a carrier from which the ribs protrude, which carrier surrounds the mounting for the at least one sealing body.

3. The shut-off device according to claim 2, wherein the mounting is fitted with an exterior thread for screwing it into the drive.

4. The shut-off device according to claim 1, wherein the at least one sealing body is shaped as a flap.

5. The shut-off device according to claim 1, wherein a sealing element is fitted on the sealing contour of the at least one sealing body.

6. A shut-off device configured to connect to an adjacent conduit in a pressure-tight manner, comprising:
   a housing;
   a tubular passage defined in the housing configured to conduct a medium flowing through the conduit;
   at least one sealing body that can be displaced by an articulated mechanism using an adjusting drive that can be moved vertically in relation to the direction of medium flow;
   the at least one sealing body moving from an open position to a closed position in which a sealing contour of the at least one sealing body comes into contact with the tubular passage in a radially sealing manner; wherein
   the articulated mechanism is guided parallel to the direction of displacement of the adjusting drive and comprises a bearing body to which the at least one sealing body is pivotably applied;
   the bearing body comprises two diametrically opposed ribs that are guided within grooves provided in one of the housing and an insert lining at least a portion of the housing;
   the two diametrically opposed ribs form a span extending transversally to the direction of flow of the medium; and
   the sealing contour of the at least one sealing body expands during substantial axial pressure caused by the flowing medium.

7. The shut-off device according to claim 6, wherein the bearing body includes a carrier from which the ribs protrude, and wherein the carrier surrounds a mounting for the at least one sealing body.

8. The shut-off device according to claim 7, wherein the mounting comprises an exterior thread for screwing the mounting into the adjusting drive.

9. The shut-off device according to claim 6, wherein the at least one sealing body is shaped as a flap.

10. The shut-off device according to claim 6, wherein a sealing element is fitted on the sealing contour of the at least one sealing body.

11. The shut-off device according to claim 6, wherein the two diametrically opposed ribs comprise a V-shaped contour.

12. The shut-off device according to claim 6, wherein the adjusting drive comprises a square drive and a spindle.

13. The shut-off device according to claim 12, wherein a number of revolutions of the spindle necessary to open and close the shut-off device is controlled by a pitch of the spindle and the travel necessary to operate the shut-off device.

* * * * *